United States Patent
Buban et al.

(10) Patent No.: US 10,544,482 B2
(45) Date of Patent: Jan. 28, 2020

(54) RECOVERY OF COPPER FROM ARSENIC-CONTAINING PROCESS FEED

(71) Applicant: Sherritt International Corporation, Fort Saskatchewan (CA)

(72) Inventors: Kelvin Richard Buban, Fort Saskatchewan (CA); Michael Joseph Collins, Fort Saskatchewan (CA); Preston Carl Holloway, Edmonton (CA)

(73) Assignee: Sherritt International Corporation, Fort Saskatchewan (CA)

( * ) Notice: Subject to any disclaimer, the term of this patent is extended or adjusted under 35 U.S.C. 154(b) by 350 days.

(21) Appl. No.: 15/202,084

(22) Filed: Jul. 5, 2016

(65) Prior Publication Data

US 2017/0009318 A1    Jan. 12, 2017

Related U.S. Application Data

(60) Provisional application No. 62/189,081, filed on Jul. 6, 2015.

(51) Int. Cl.
    *C25C 1/12*     (2006.01)
    *C22B 3/00*     (2006.01)
    (Continued)

(52) U.S. Cl.
    CPC ............ *C22B 15/0071* (2013.01); *C22B 1/02* (2013.01); *C22B 3/08* (2013.01); *C22B 3/22* (2013.01);
    (Continued)

(58) Field of Classification Search
    CPC ............ C22B 15/0071; C22B 15/0089; C22B 15/0067; C22B 15/0084; C22B 15/0008;
    (Continued)

(56) References Cited

U.S. PATENT DOCUMENTS

| | | |
|---|---|---|
| 2,686,114 A | 8/1954 | McGauley et al. |
| 3,637,371 A | 1/1972 | Mackiw et al. |

(Continued)

FOREIGN PATENT DOCUMENTS

| | | |
|---|---|---|
| CA | 2032357 A1 | 6/1992 |
| WO | 2014122363 A1 | 8/2014 |

OTHER PUBLICATIONS

International Preliminary Report on Patentability, dated Jan. 18, 2018, corresponding to International Application No. PCT/CA2016/000188 (filed Jul. 5, 2016), parent of the present application, 9 pp.

(Continued)

*Primary Examiner* — Matthew E. Hoban
*Assistant Examiner* — Lynne Edmondson
(74) *Attorney, Agent, or Firm* — Leydig, Voit & Mayer, Ltd.

(57) ABSTRACT

Process to recover copper from a process feed including one or more feed components containing a base metal sulphidic feed, iron, copper and arsenic. Process feed and aqueous quench solution are introduced to a pressure oxidative leaching step with a partial pressure of oxygen above 200 kPa to form free sulphuric acid, to solubilize copper and other metal in the feed as aqueous sulphate compounds and to precipitate arsenic as solid iron arsenic compounds. A treated slurry comprising a liquid phase containing sulphuric acid and copper sulphate, and solids containing the iron arsenic compounds is withdrawn and the liquid phase is separated from the solids. To lessen arsenic re-dissolution and to maintain stability of the solid iron arsenic compounds, one or more of temperature, free acid level and residence time of the treated slurry is controlled. Copper metal is recovered from the separated liquid phase.

36 Claims, 10 Drawing Sheets

(51) Int. Cl.
*C22B 3/08* (2006.01)
*C22B 15/00* (2006.01)
*C22B 7/00* (2006.01)
*C22B 1/02* (2006.01)
*C22B 3/22* (2006.01)

(52) U.S. Cl.
CPC .......... *C22B 7/007* (2013.01); *C22B 15/0013* (2013.01); *C22B 15/0086* (2013.01); *C25C 1/12* (2013.01)

(58) Field of Classification Search
CPC ... C22B 15/0063; C22B 15/0013; C22B 3/08; C22B 3/0005; C22B 3/44; C22B 3/22; C22B 30/00; C22B 1/00; C22B 1/02; C22B 7/007; C22B 11/04; C25C 1/12
USPC ......... 75/743, 740, 739, 731; 423/27, 658.5, 423/109, 20, 522, 602, 87; 205/580, 574
See application file for complete search history.

(56) References Cited

U.S. PATENT DOCUMENTS

| | | | |
|---|---|---|---|
| 3,917,519 A * | 11/1975 | Fisher | C22B 15/0071 205/584 |
| 3,962,402 A | 6/1976 | Touro | |
| 4,149,880 A | 4/1979 | Prater et al. | |
| 4,244,734 A | 1/1981 | Reynolds et al. | |
| 4,571,264 A | 2/1986 | Weir et al. | |
| 4,610,723 A | 9/1986 | Nogueira et al. | |
| 5,071,477 A | 12/1991 | Thomas et al. | |
| 5,458,866 A | 10/1995 | Simmons | |
| 5,698,170 A * | 12/1997 | King | C01G 3/003 423/24 |
| 5,895,633 A | 4/1999 | King | |
| 6,251,163 B1 | 6/2001 | King | |
| 6,451,088 B1 | 9/2002 | Marsden et al. | |
| 6,451,089 B1 | 9/2002 | Marsden et al. | |
| 6,497,745 B2 | 12/2002 | Marsden et al. | |
| 6,626,979 B2 | 9/2003 | Marsden et al. | |
| 6,663,689 B2 | 12/2003 | Marsden et al. | |
| 6,676,909 B2 | 1/2004 | Marsden et al. | |
| 6,680,034 B2 | 1/2004 | Marsden et al. | |
| 6,755,891 B2 | 6/2004 | Jones | |
| 6,890,371 B2 | 5/2005 | Marsden et al. | |
| 6,893,482 B2 | 5/2005 | Marsden et al. | |
| 6,972,107 B2 | 12/2005 | Marsden et al. | |
| 7,041,152 B2 | 5/2006 | Marsden et al. | |
| 7,125,436 B2 | 10/2006 | Marsden et al. | |
| 7,341,700 B2 | 3/2008 | Marsden et al. | |
| 7,462,272 B2 | 12/2008 | Marsden et al. | |
| 7,473,413 B2 | 1/2009 | Marsden et al. | |
| 7,476,308 B2 | 1/2009 | Marsden et al. | |
| 7,485,216 B2 | 2/2009 | Marsden et al. | |
| 7,517,384 B2 | 4/2009 | Marsden et al. | |
| 7,604,783 B2 | 10/2009 | King et al. | |
| 7,666,371 B2 | 2/2010 | Marsden et al. | |
| 7,713,500 B2 | 5/2010 | Johnson | |
| 7,722,756 B2 | 5/2010 | Marsden et al. | |
| 7,736,475 B2 | 6/2010 | Sandoval et al. | |
| 7,736,476 B2 | 6/2010 | Gilbert et al. | |
| 7,736,486 B2 | 6/2010 | Stevens et al. | |
| 7,736,487 B2 | 6/2010 | Marsden et al. | |
| 7,736,488 B2 | 6/2010 | Marsden et al. | |
| 8,012,318 B2 | 9/2011 | Marsden et al. | |
| 8,016,983 B2 | 9/2011 | Stevens et al. | |
| 8,029,751 B2 | 10/2011 | King et al. | |
| 8,187,450 B2 | 5/2012 | Sandoval et al. | |
| 8,252,254 B2 | 8/2012 | Choi et al. | |
| 8,273,237 B2 | 9/2012 | Marsden et al. | |
| 8,420,048 B1 | 4/2013 | Raman et al. | |
| 8,491,701 B2 | 7/2013 | Uhrie et al. | |
| 8,623,115 B2 | 1/2014 | Langhans, Jr. et al. | |
| 9,194,023 B2 | 11/2015 | Wang et al. | |
| 2008/0173132 A1 | 7/2008 | Dunn et al. | |
| 2009/0019970 A1 | 1/2009 | Ritchie et al. | |
| 2009/0293680 A1 * | 12/2009 | Ritchie | C22B 1/00 75/744 |

OTHER PUBLICATIONS

Bruce et al. (2011) "Unlocking Value in Copper Arsenic Sulphide Resources with the Copper-Arsenic CESL Technology," Hydro-Copper Conference Proceedings. (cesl.com, accessed Oct. 28, 2014).
Collins et al. (2012) "Design of the AGA Brasil Refractory Gold Pressure Oxidation Plant," Pressure Hydrometallurgy. CIM, Westmount, Canada. 3-14.
Ferron et al. (2003) "Copper Arsenide as a Sustainable Feedstock for the Copper Industry," SGS Mineral Services, TP2003-15.
Geldart et al. (1992) "Aqueous pressure oxidation as a waste treatment process-stabilizing roaster wastes," Hydrometallurgy. 30:29-44.
Gomez et al. (May 2011) "Hydrothermal reaction chemistry and characterization of ferric arsenate phases precipitated from $Fe_2(SO_4)_3$-$As_2O_5$-$H_2SO_4$ solutions," Hydrometallurgy. 107(3-4):74-90.
Marsden et al. (May 22-23, 2003) "Hydrometallurgical Processing of Copper Concentrates by Phelps Dodge at the Bagdad Mine in Arizona," Presented at ALTA Copper, Perth, Australia.
Riveros et al. (2001) "Arsenic Disposal Practices in the Metallurgical Industry," Canadian Metallurgical Quarterly. 40(4):395-420.
Environmental Protection Agency Publication SW-846, Test Methods for Evaluating Solid Waste Physical/Chemical Methods, Method 1311, Toxicity Characteristic Leaching Procedure, Revision 0, Jul. 1992.
International Search Report with Written Opinion corresponding to International Patent Application No. PCT/CA2016/000188, dated Oct. 27, 2016.
African Regional Intellectual Property Organization, Office Action, dated Sep. 6, 2019, in African Patent Application No. AP/P/2017/010417, 6 pages.

* cited by examiner

RECOVERY OF COPPER FROM ARSENIC-CONTAINING PROCESS FEED

CROSS-REFERENCE TO RELATED APPLICATION

This application claims priority from U.S. Provisional Patent Application No. 62/189,081 filed Jul. 6, 2015, which is incorporated by reference herein to the extent that there is no inconsistency with the present disclosure.

FIELD OF THE INVENTION

This invention is directed to a process for recovering copper from sulphidic feeds containing iron, copper and arsenic.

BACKGROUND

In most recent patents involving the pressure leaching of copper materials, copper is recovered from solution by solvent extraction and electrowinning. This is recognized as an improvement, with regards to reagent costs and product purity compared to earlier patents that use cementation with iron to recover copper (see for example, U.S. Pat. No. 2,686,114 by Chemico; and U.S. Pat. No. 4,610,723 to Nogueira et al.).

Most patents that include the pressure leaching of copper materials, including the entire series of U.S. Patents by Phelps Dodge/Freeport McMoran, listed below, do not mention or address the solubility or deportment of arsenic within leaching, letdown / conditioning, or other subsequent steps (see U.S. Pat. Nos. 6,451,089; 6,451,089; 6,497,745; 6,626,979; 6,663,689; 6,680,034; 6,890,371; 6,893,482; 6,972,107; 7,041,152; 7,125,436; 7,341,700; 7,462,272; 7,473,413; 7,476,308; 7,485,216; 7,517,384; 7,666,371; 7,736,487; and 7,736,488).

In general, patents that do address the deportment of arsenic teach the following methods for treating soluble arsenic, either in the pressure leach solution or in the raffinate from solvent extraction:

i. Atmospheric neutralization and precipitation of calcium and/or iron arsenate solids for disposal (Chemico, U.S. Pat. No. 2,686,114);

ii. Evaporation, neutralization and recycle of arsenical solutions to the autoclave (CESL, U.S. Pat. No. 6,755,891); and iii. Neutralization and precipitation of calcium and/or iron arsenate solids and recycle to the autoclave (Dundee Precious Metals Inc., U.S. Published Patent Applications 2009/0293680 and 2009/0019970, now abandoned).

Disadvantages to these methods are many. With the recycle of solids or solutions to the autoclave, there is a recirculating load of arsenic to the autoclave. This means that a portion of the iron in the feed is required to react with this recycled material to form iron-arsenic compounds. The higher the arsenic recycle, the less "fresh" arsenic that can be processed to maintain a certain Fe:As molar ratio (as is proposed in both the Dundee and CESL patent documents). None of the above patent references indicate or address the size of this recycle, nor provisions to control or maintain it at certain levels.

Atmospheric precipitation of arsenic with calcium or iron, unless arsenic is precipitated as scorodite ($FeAsO_4:2H_2O$), which is not presented in any of the above patent references, will result in the production of a residue that is not likely to be as environmentally stable as materials produced at elevated temperatures.

All of these methods involve the neutralization of solutions that typically contain significant amounts of free acid. In each case, additional neutralizing agent is required to neutralize the free acid prior to recycle or disposal, and, with the use of calcium-based reagents, as is proposed in the patent references, this can result in the loss of the sulphate associated with the free acid, and the sulphate associated with other metal ions that are precipitated, from those solutions as gypsum.

None of the above patents teach methods to minimize or control the amount of arsenic in the pressure leach or raffinate solutions.

In gold pressure oxidation, arsenic in solution is generally dealt with, along with other dissolved metal ions, by neutralization and precipitation with lime and limestone to allow for recycle of the neutralized solution within the pressure oxidation plant, see for example U.S. Pat. No. 4,571,264 to Sherritt Gordon Mines Ltd., now Sherritt International Corporation. Without a need to recover copper or other metals from solution, these gold processes do not otherwise address minimizing or controlling the arsenic in solution.

Most of the patent references involving pressure leaching of gold or copper concentrates address the need to lower the pressure and temperature of the autoclave slurry, prior to subsequent downstream steps, including liquid solid separation (e.g. CCD-countercurrent decantation wash), neutralization or solvent extraction steps. Flashing of the slurry to evaporatively cool the slurry in a flash vessel is proposed in an early patent, U.S. Pat. No. 2,686,114, and indirect slurry cooling (e.g. with slurry coolers or heat exchangers) is proposed in several patents, as summarized in the below-listed patents.

U.S. Pat. No. 2,686,114 to Chemico—flashing;
U.S. Pat. No. 3,962,402 to Freeport Minerals—cooling coils, batch testing;
U.S. Pat. No. 5,071,477 to Barrick Gold—flashing, indirect cooling;
U.S. Pat. No. 5,458,866 to Santa Fe Pacific Gold Corp.—cooling, unspecified;
U.S. Pat. No. 5,698,170 to Placer Dome, now Barrick—flashing;
U.S. Pat. No. 5,895,653 to Placer Dome, now Barrick—flashing;
U.S. Pat. No. 6,251,163 to Placer Dome, now Barrick—flashing, cooling in CCD, or cooling by dilution with wash water in the CCD;
U.S. Pat. No. 6,451,088 to Freeport McMoran—flashing;
U.S. Pat. No. 6,680,034 to Freeport McMoran—flashing, indirect cooling;
U.S. Pat. No. 7,713,500 to Western Minerals—multistage flash cooling;
U.S. Published Application 2009/0293680 to Dundee Precious Metals—flashing; and
U.S. Published Application 2009/0019970 to Dundee Precious Metals—flashing.

The above-listed U.S. patents to Freeport McMoran/Phelps Dodge dating from 2002 to 2010 use a "conditioning" step. For example, U.S. Pat. No. 7,736,487 indicates that a copper-bearing solution may be prepared and conditioned for metal recovery through one or more chemical and/or physical processing steps. The product stream from a reactive processing step may be conditioned to adjust the composition, component concentrations, solids content, volume, temperature, pressure, and/or other physical and/or chemical parameters to desired values and thus to form a suitable copper-bearing solution.

The teachings of those patents for "conditioning", in addition to flashing and/or slurry cooling to reduce the temperature of the autoclave slurry, are as follows, with the first patent in this series to mention the specific unit operation noted in parentheses:

i. liquid solid separation (thickening or filtration) (U.S. Pat. No. 6,451,088);
  ii. solvent extraction for copper recovery (U.S. Pat. No. 6,451,088); and
  iii. adjusting solution composition by blending with other solutions (U.S. Pat. No. 6,663,689).

U.S. Pat. No. 6,755,891 to CESL relates to processing arsenical copper materials and is an extension of earlier patents using the CESL process, which includes pressure leaching under medium temperature (150° C.) conditions to form elemental sulphur in the presence of significant levels of chloride. While the concentration of chloride is not listed in the patent, a concentration of 12 g/L Cl is indicated in other publications.

Despite the above-mentioned teachings relating to treating arsenical copper materials, or other arsenic-containing materials, there remains a need for a process to effectively remove arsenic from copper containing feeds while producing environmentally stable arsenic solids from the process.

SUMMARY OF THE INVENTION

Pressure leaching of arsenical base metal sulphides to produce a copper solution for recovery of copper by solvent extraction and electrowinning and to produce an arsenic-containing residue, as indicated above, is known in the industry. The process herein preferably includes controlling the molar ratio of iron to arsenic (Fe:As) in the combined process feed to the pressure oxidative leaching step to high molar ratios, and conducting steps which may follow the pressure oxidative leaching step, that is pressure letdown, cooling, neutralizing and/or liquid solid separation, in a manner to limit one or more of residence time, exposure to high temperatures and exposure to high free acid levels. Limiting exposure to these conditions is found to lessen arsenic re-dissolution and to maintain stability of the solid iron arsenic compounds. These steps are found to allow for the combination of high copper recovery to the leach solution, low concentrations of arsenic in the leach solution, and the production of a stable arsenic residue.

Broadly stated, a process is provided for recovering copper from a process feed which includes one or more feed components containing a base metal sulphidic feed, iron, copper and arsenic. The process includes:

a) preparing the process feed and an aqueous quench solution, preferably in a manner so that a molar ratio of iron to arsenic (Fe:As) is greater than 4:1 for the combined process feed and the aqueous quench solution;

b) introducing the process feed and the aqueous quench solution to a pressure oxidative leaching step in a pressure vessel and providing oxygen to maintain a partial pressure of oxygen above 200 kPa in the pressure vessel to form free sulphuric acid, to solubilize copper and other metal in the feed as aqueous sulphate compounds and to precipitate arsenic as solid iron arsenic compounds;

c) withdrawing from the pressure vessel a treated slurry comprising a liquid phase containing sulphuric acid and copper sulphate, and solids containing the iron arsenic compounds, and separating the liquid phase from the solids while controlling one or more of temperature, free acid level and residence time of the treated slurry in order to lessen arsenic re-dissolution and to maintain stability of the solid iron arsenic compounds; and d) recovering copper metal from the separated liquid phase.

As used herein and in the claims, the terms and phrases set out below have the following definitions.

"Free acid level" refers to the concentration of $H_2SO_4$ in solution. The standard used to measure free acid level is conducted at room temperature (20° C.) by titrating of an aliquot of acidic solution with sodium carbonate solution to pH 3.5. Before performing this titration, potassium iodide is added to the solution to react with ferric iron ($Fe^{3+}$), which may hydrolyze and interfere with the $H_2SO_4$ titration, and sodium thiosulphate solution is added to react with any iodine ($I_2$) that is formed. The reactions involved in this determination are provided below:

$$2Fe^{3+}+2I^-=2Fe^{2+}+I_2$$

$$I_2+2S_2O_3^{2-}=2I^-+S_4O_6^{2-}$$

$$H_2SO_4+Na_2CO_3 \rightarrow Na_2SO_4+H_2O+CO_2.$$

"Stability" as used herein with reference to arsenic residue stability or the stability of solid iron arsenic compounds which are formed in pressure oxidative leaching, is used with reference to maintaining the stability of the arsenic solids that have been formed in the pressure oxidative leaching step in the process steps subsequent to pressure oxidative leaching, and refers to the environmental stability as measured by standard Toxicity Characteristic Leaching Procedure (TCLP). TCLP is an testing methodology for waste materials, with protocols set by Environmental Protection Agency (EPA) in the United States, and other countries, see Environmental Protection Agency Publication SW-846, "Test Methods for Evaluating Solid Waste, Physical/Chemical Methods", Method 1311, "Toxicity Characteristic Leaching Procedure", Revision 6, February 2007. The current limit for arsenic in the TCLP leachate in the United States is 5 mg/L, (see Code of Federal Regulations, Title 40, Vol. 27, Section 261.24, Jul. 1, 2012). Solid iron arsenic compounds that are more stable than the regulatory limit (i.e., arsenic in TCLP leachate is less than 5 mg/L) can be formed in the pressure oxidative leaching step. Thus, "maintaining the stability" of the solid iron arsenic compounds as used herein refers to limiting the change in the stability of these solids, as measured by TCLP, from after pressure oxidation until after the solids are separated from the acidic leach solution.

BRIEF DESCRIPTION OF THE DRAWINGS

FIGS. 2 to 16 are flow diagrams for different options for conducting the letdown, cooling, neutralizing steps prior to a liquid-solid separation step as described herein, in which:

FIG. 2 represents Option 1A: Flashing and cooling with indirect heat exchanger;

FIG. 3 represents Option 1B: Flashing and cooling with direct heat exchanger;

FIG. 4 represents Option 2: Flashing and direct cooling;

FIG. 5 represents Option 3A: Flashing and direct cooling with slurry recycle, indirect heat exchanger;

FIG. 6 represents Option 3B: Flashing and direct cooling with slurry recycle, direct heat exchanger;

FIG. 7 represents Option 4: Indirect cooling and pressure letdown;

FIG. 8 represents Option 5: Direct Cooling with recycle solution and pressure letdown;

FIG. 9 represents Option 6: Flashing and neutralization;

FIG. 10 represents Option 7A: Flashing, neutralization and cooling with a direct heat exchanger;

FIG. 11 represents Option 7B: Flashing, neutralization and direct cooling with recycle solution;

FIG. 12 represents Option 7C: Flashing, direct cooling with heat exchanger and neutralization;

FIG. 13 represents Option 7D: Flashing, direct cooling with a cooled process solution, and neutralization;

FIG. 14 represents Option 8: Direct cooling with recycle solution, pressure letdown and neutralization;

FIG. 15 represents Option 9: Indirect Cooling with heat exchanger, pressure letdown, and neutralization; and FIG. 16 represents Option 10: Flashing and bulk liquid-solid separation.

DETAILED DESCRIPTION OF THE INVENTION

Figure 1:
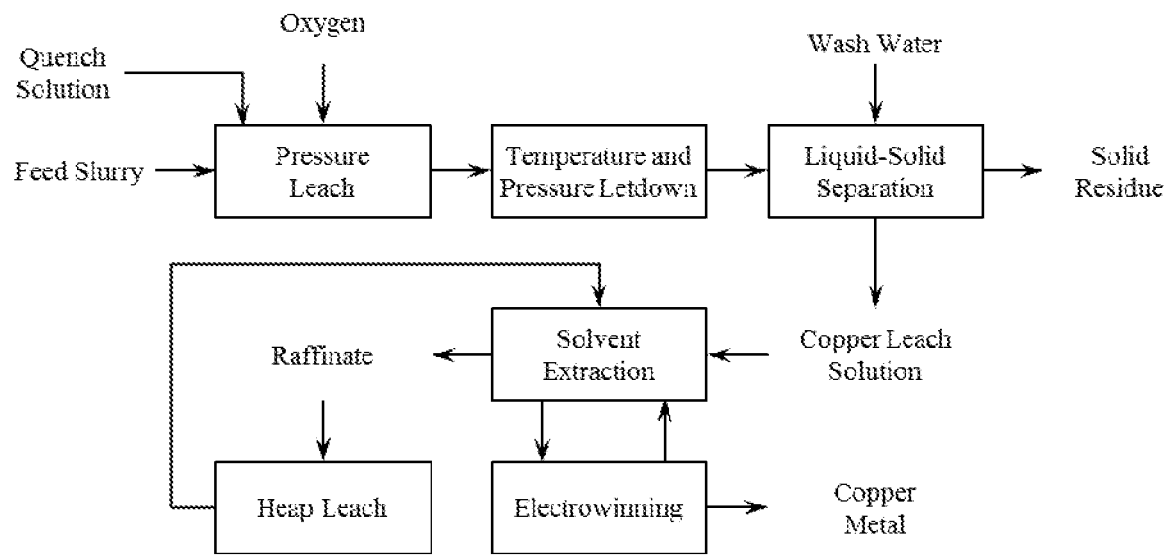
FIG. 1 is a flow diagram showing a typical process according to one embodiment of the process.

One exemplary embodiment for the process is shown in FIG. 1. In some embodiments, the process includes steps A-D, and optionally E, as set out below.

A. Process feed containing one or more feed components and quench solution are prepared for separate or combined addition to a pressure vessel, preferably in a manner so that the molar ratio of Fe:As in the combined process feed and quench solution to be added to the pressure vessel is greater than 4:1. The molar ratio of Fe:As in the combined process feed and quench solution is more preferably at or greater than 4.5:1, 5:1 or 6:1.

B. Process feed and quench solution are introduced to the pressure vessel such as an autoclave for a pressure oxidative leaching step to oxidize the process feed at elevated temperature and pressure with oxygen to form free sulphuric acid, to solubilize copper and other metal in the feed as aqueous sulphate compounds and to precipitate arsenic as solid iron arsenic compounds.

C. Withdrawn from the autoclave is a treated slurry including a liquid phase containing sulphuric acid and copper sulphate, and solids containing the iron arsenic compounds, and the liquid phase is separated from the solids while controlling one or more of temperature, free acid level and residence time of the treated slurry in order to lessen arsenic re-dissolution and to maintain stability of the solid iron arsenic compounds.

D. Copper metal is recovered from the separated liquid phase, such as by conventional copper solvent extraction, to produce a high purity copper solution for copper recovery by electrowinning and a raffinate solution containing acid values and essentially all of the of arsenic in the liquid fraction.

E. The raffinate solution from solvent extraction is used to leach copper from oxide and/or sulphidic ores, or for neutralizing the raffinate solution for disposal or to recycle to the pressure leaching step as quench solution.

In step C, the treated slurry may be subjected to one or more of the following pressure letdown, cooling, neutralizing steps, and solid/liquid separation in a manner to control the amount of arsenic re-dissolved and to maintain the environmental stability of the iron arsenic compounds in the solids:

i. Flashing of the slurry in a flash vessel;

ii. Cooling of the slurry by direct addition of a lower temperature solution and/or slurry stream, either from an external source or from a recycle from within the process;

iii. Cooling of all or a portion of the slurry by indirect contact with a cooler liquid (e.g. in a heat exchanger);

iv. Cooling of all or a portion of the slurry using evaporative cooling (e.g. cooling tower);

v. Neutralizing a portion of the free acid in the discharge slurry by the addition of a neutralizing agent; and vi. Immediate solid/liquid separation after flashing.

By being able to control and/or minimize the amount of arsenic in the copper product solution, the process makes provision for the option of integrating the pressure leach plant with a heap leach operation. The heap leach makes use of the acid produced from the total oxidation of the sulphide minerals in the autoclave feed to leach additional copper values, which may otherwise need to be made up with purchased sulphuric acid solutions. Thus, the ability to integrate a pressure leach of sulphide feeds with a heap leach operation may significantly reduce the operating costs for an existing heap leach operation.

The control and/or minimization of arsenic re-dissolution and the utilization of the acid in the heap leach may also reduce the need to neutralize and/or recycle the leach solution to fix arsenic from the leach solution as a stable iron arsenate precipitate.

A. Process Feed and Quench Solution

In some embodiments, the process feed to the process may include one or more feed components, in separate or combined process feed to the autoclave, including:

i. Arsenical copper ores or concentrates containing sulphide minerals, for example copper-containing sulphide ore or concentrate;

ii. Arsenical materials generated from pyrometallurgical treatment of sulphides (e.g. roaster dusts from treatment of copper ore or concentrates); and iii. Concentrates containing base metal sulphides, including copper sulphides, that contain iron, but little arsenic.

The quench solution, typically an aqueous quench solution, is added with the process feed to control temperature in the pressure oxidative leach step. The quench solution may be added separately from the process feed, or the one or more of the feed components may be combined with, or slurried with, the quench solution. The quench solution may include process water and/or solutions containing arsenic in dissolved form. The process water may contain dissolved salts, for example salts of Ca, K, and/or Na.

In some embodiments of the process, the process feed to the autoclave may include one or more copper-containing neutralizing agents to reduce the free acid, and thus to reduce the free acid in the treated slurry withdrawn from the autoclave. The copper-containing neutralizing agents may include:

i. Materials containing copper sulphide minerals, in which the overall copper sulphide has a Cu:S molar ratio greater than 1:1, such as copper matte;

ii. Materials containing copper oxides or hydroxides, such as copper oxide ores or concentrates, roaster dusts or calcines, copper oxides, copper hydroxides or basic copper sulphate.

The copper minerals in these copper-containing neutralizing agents may react by one of the following reactions to dissolve copper and neutralize free acid in the autoclave:

$$Cu_2S + H_2SO_4 + 2.5O_2 = 2CuSO_4 + H_2O$$

$$CuO + H_2SO_4 = CuSO_4 + H_2O$$

$$Cu_2O + 2H_2SO_4 + 0.5O_2 = 2CuSO_4 + 2H_2O$$

$$Cu(OH)_2 + H_2SO_4 = CuSO_4 + 2H_2O.$$

In accordance with some embodiments of the process, the total Fe:As molar ratio of the combined process feed to the autoclave (i.e., all feed components of the process feed, all of the quench solution, and any neutralizing agents, whether added separately or combined) is greater than 4:1, and more preferably at or greater than 4.5:1, 5:1 or 6:1. This can be accomplished by adjusting the amount and type of the one or more feed components of the process feed and/or by adjusting the amount and type of quench solution.

Figure 17:
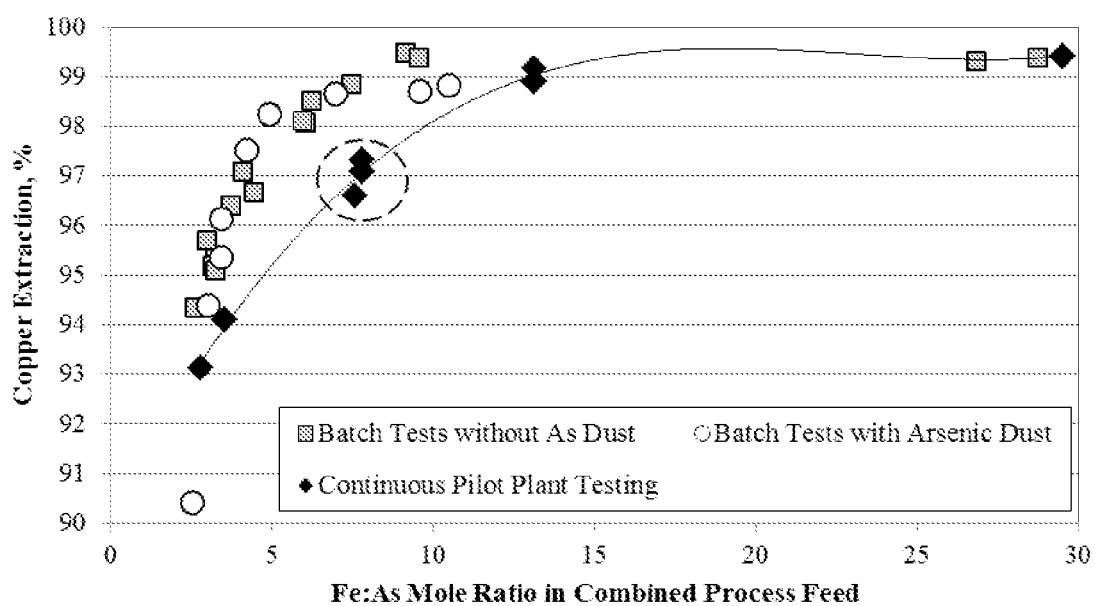
FIG. 17 is a graph showing copper extraction as a function of Fe:As molar ratio in the combined process feed, as determined in Example 1.

Unlike the prior art patents and patent applications (for example, CESL, U.S. Pat. No. 6,755,891; Dundee, U.S. 2009/0293680, U.S. 2009/0019970), the inventors discovered that the precipitation of copper arsenates occurs at all practical Fe:As molar ratios, but the extent of copper arsenate precipitation is lower at Fe:As molar ratios greater than 4:1. FIG. 17 shows the relationship between net copper extraction to solution and Fe:As molar ratio in the feed determined experimentally in tests performed at 220° C., as set out in Example 1 below.

B. Pressure Oxidative Leaching and Autoclave Conditions

Pressure oxidative leaching is conducted in a pressure vessel, such as a high pressure autoclave, with oxygen at high temperature and high pressure conditions, as is generally known in the industry. The autoclave may include one or more compartments fitted for agitation and addition of quench solution and oxygen. A multi-compartment autoclave acts as a series of continuous stirred tank reactors with slurry transferring to successive compartments by overflow.

In some embodiments of the present process, the following conditions for the operating of the pressure oxidative leaching step are found to produce favourable results:

i. Temperature of 210 to 230° C., preferably 215 to 225° C.;

ii. Oxygen partial pressure of 200 to 1000 kPa, preferably about 500 kPa; and iii. Retention time of 30 to 90 minutes, preferably 45 to 60 minutes.

The flow of the solids process feed and flow and distribution of the quench solution to the autoclave compartment(s) are preferably controlled to maintain the operating temperature of the autoclave such that the autoclave can be operated autothermally (i.e., the oxidation reactions provide enough heat to maintain the autoclave temperature without the requirement of an additional heat source (e.g. steam).

C. Letdown, Cooling, Neutralizing and Liquid-Solid Separation

In accordance with embodiments of this process, the pressure letdown step, any cooling or neutralizing steps, and the subsequent liquid-solid separation step, are performed to minimize the amount of time that the autoclave discharge solids are exposed to the presence of elevated temperatures and/or relatively high acid concentrations. Examples 2 and 3 below demonstrate that, beneficial results are achieved when the treated slurry from the autoclave is reduced to less than 50° C. and/or below 35 g/L free $H_2SO_4$, preferably in less than 1 hour, and more preferably in less than 30 minutes. Limiting the time that the treated slurry is exposed to one or both of these conditions is found to lessen arsenic re-dissolution and to maintain the stability of the precipitated solid iron arsenic compounds.

A number of different unit operations and configurations of unit operations can be used in the letdown and cooling step to limit exposure to one or both of these conditions. Preferred conditions for a particular installation of this process depend on the availability of cooling water, cool solution recycle streams, and neutralizing agent, for example limestone, as well as the local operating costs for each option. A number of different exemplary embodiments of these steps are summarized as options 1 to 10 below, and are shown as schematic flowcharts in FIGS. 2 to 16.

Option 1: Flashing and Cooling with a Heat Exchanger

Figure 2:
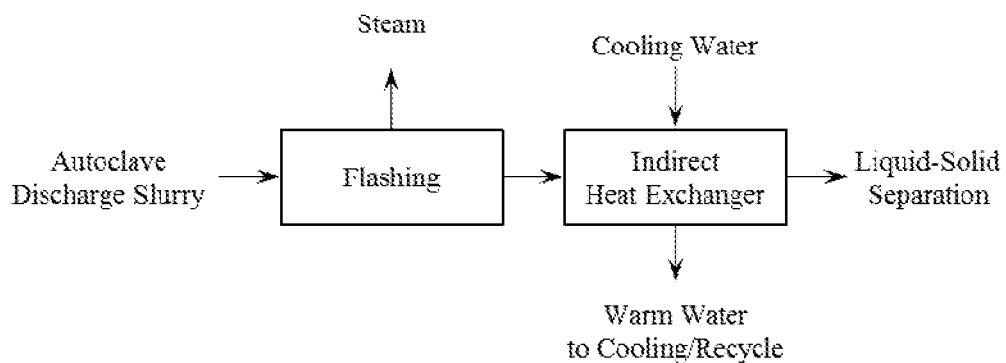
Figure 3:
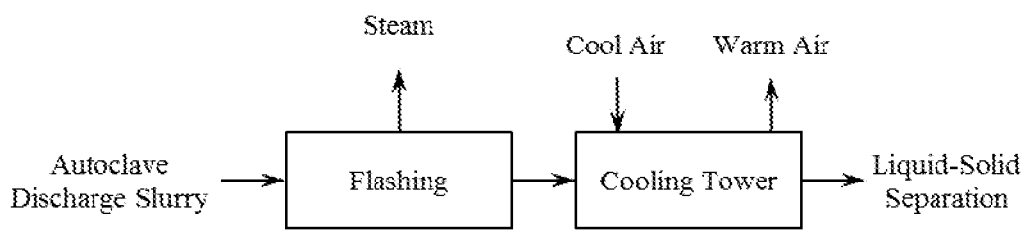

One option is to reduce the pressure and temperature of the autoclave discharge slurry to atmospheric conditions in a flash vessel and then cool the slurry, for example with a heat exchanger. The cooling can be done by passing a cooling solution through cooling coils in a stirred tank or in a heat exchanger (i.e., indirect heat exchanger) or by passing the treated slurry through a cooling tower (i.e. direct heat exchanger), as indicated in FIGS. 2 and 3.

Option 2: Flashing and Direct Cooling with Recycle Solution

Figure 4:
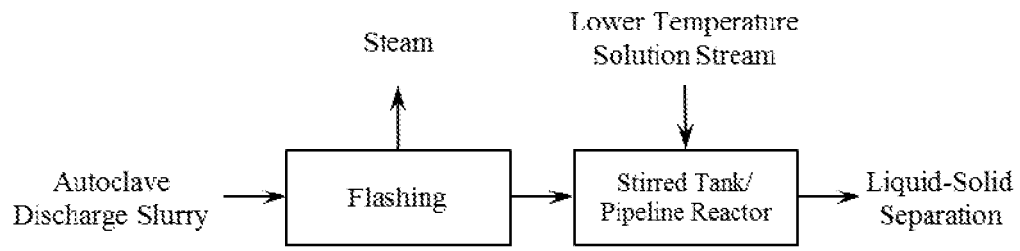

Similarly, flashing can be used in combination with direct cooling, with cooler solution recycled from another portion of the plant (for example, heap leach solution, CCD solution, etc.) being added directly to the flashed slurry in a tank, pipeline reactor or another point downstream from the flash tank to provide cooling. This option is shown in FIG. 4.

Option 3: Flashing and Indirect Cooling

Figure 5:
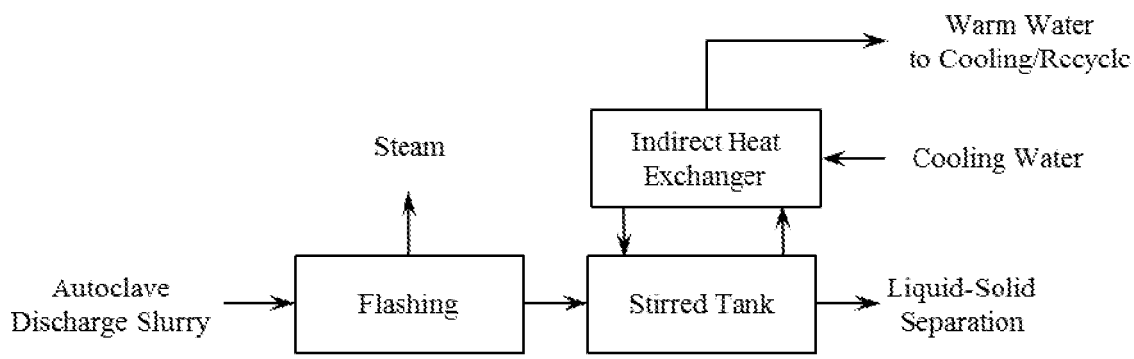
Figure 6:
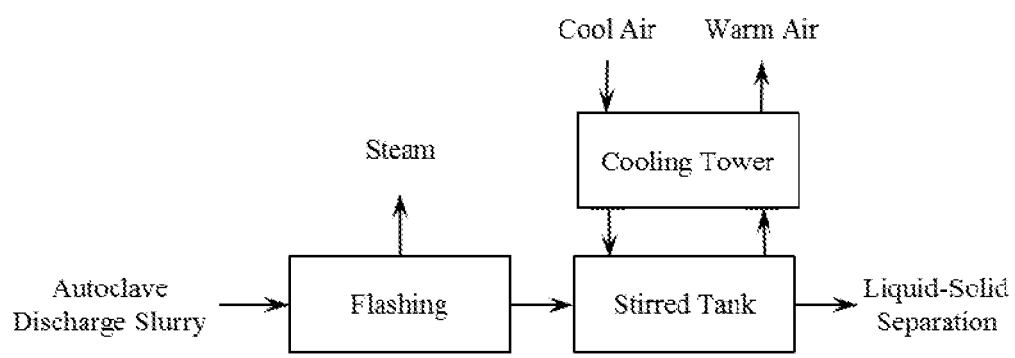

Similarly, flashing can be used in combination with indirect cooling, either in a heat exchanger using cooling water or in a cooling tower using air as the coolant, to cool the autoclave discharge slurry prior to liquid solid separation. These options are shown in FIGS. 5 and 6.

Option 4: Indirect Heat Exchanger and Pressure Letdown

Figure 7:
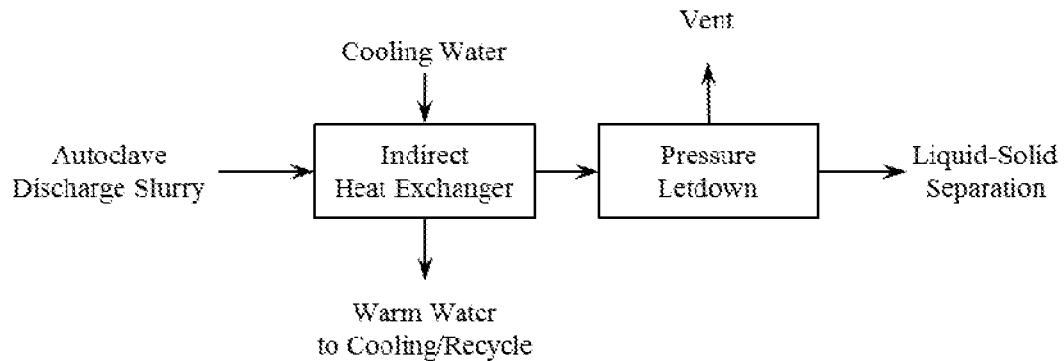

Instead of using flashing as the first step to cool the slurry, indirect cooling using a heat exchanger can be used to reduce the temperature of the autoclave discharge slurry, prior to letting down the pressure of the slurry to atmospheric pressure. This configuration also reduces the amount of steam lost from flashing, resulting a solution with a lower free acid level. This option is shown in FIG. 7.

Option 5: Direct Cooling with Recycle Solution and Pressure Letdown

Figure 8:
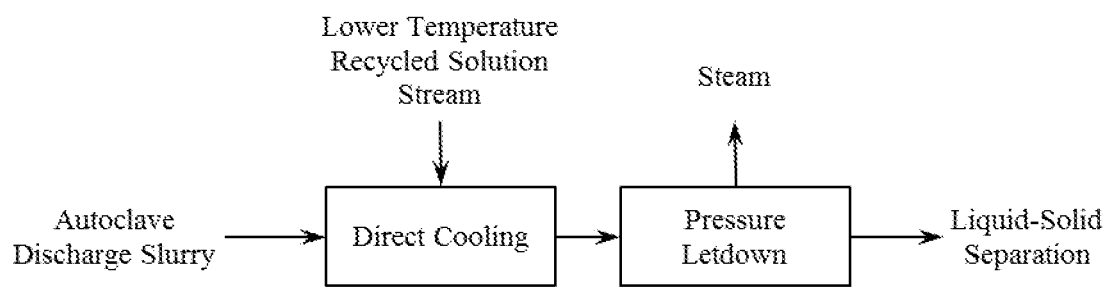

Instead of using flashing as the first step to cool the slurry, the slurry can be cooled by adding a cool recycle solution directly to the autoclave discharge slurry before it enters the pressure letdown tank, as shown in FIG. 8.

Option 6: Flashing and Neutralization

Figure 9:
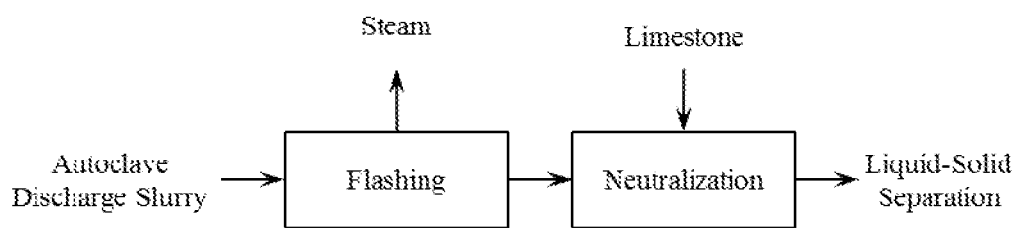
Figure 10:
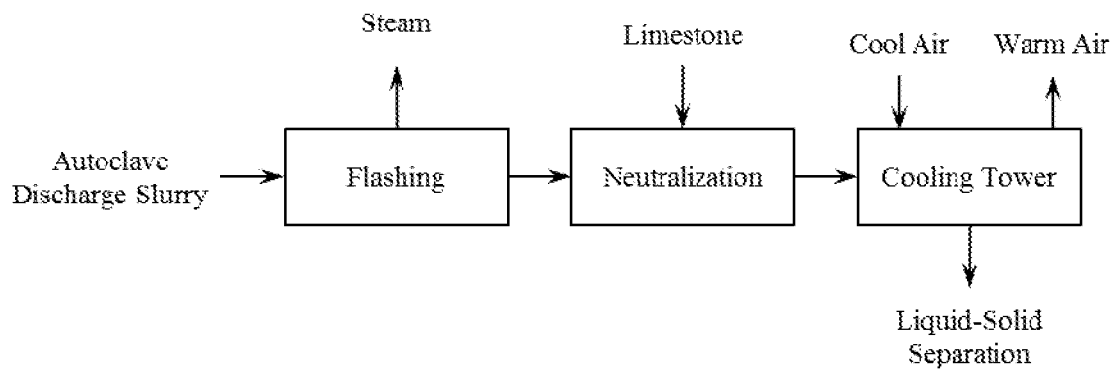
Figure 11:
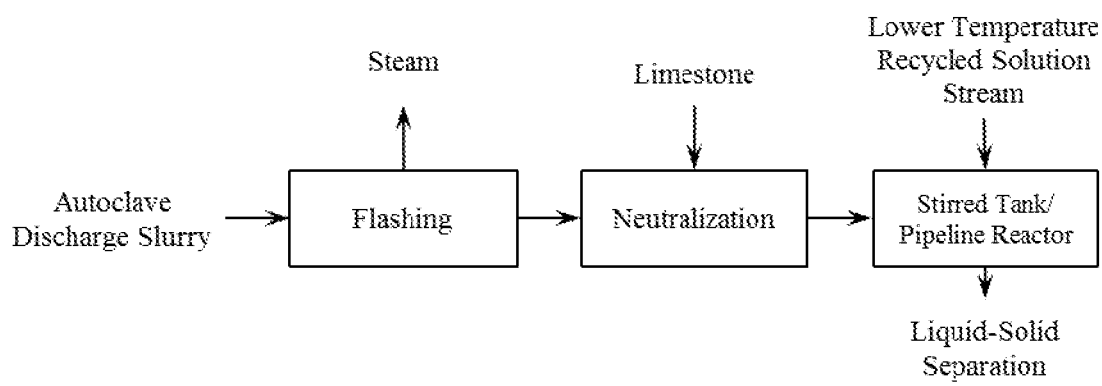
Figure 12:
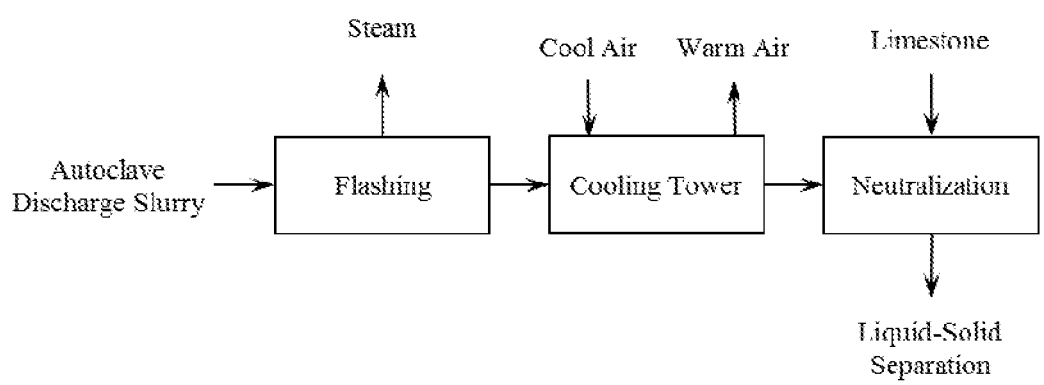
Figure 13:
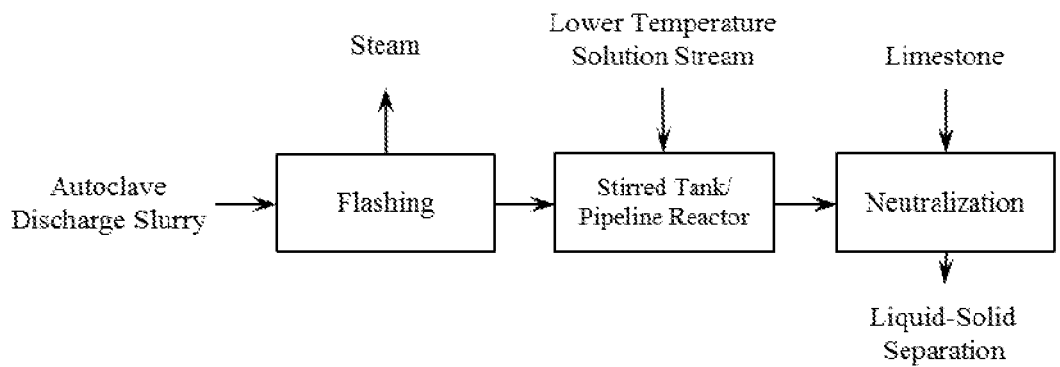

In situations where cooling water is not readily available and where acid values are less valuable, it may be advantageous for the autoclave discharge slurry to be neutralized following flashing, using limestone or another suitable neutralizing reagent, in a neutralization tank. In this option, the reduction of the acid concentration of the slurry is the major driver for controlling the arsenic concentration in solution and residue stability. This option is shown in FIG. 9.

Option 7: Flashing, Neutralization and Cooling

In this option, both the acid concentration and slurry temperature are reduced to control the arsenic concentration in solution and residue stability. The autoclave discharge slurry can be neutralized, following flashing, using limestone or another suitable neutralizing reagent, in a neutralization tank, either before or after the slurry has been cooled. Cooling of the slurry can be accomplished using direct addition of a cool process solution to the slurry or using a heat exchanger (e.g., cooling tower), with the cooling steps occurring either before or after the neutralization step. These options are shown in FIGS. 10, 11, 12 and 13.

Figure 14:
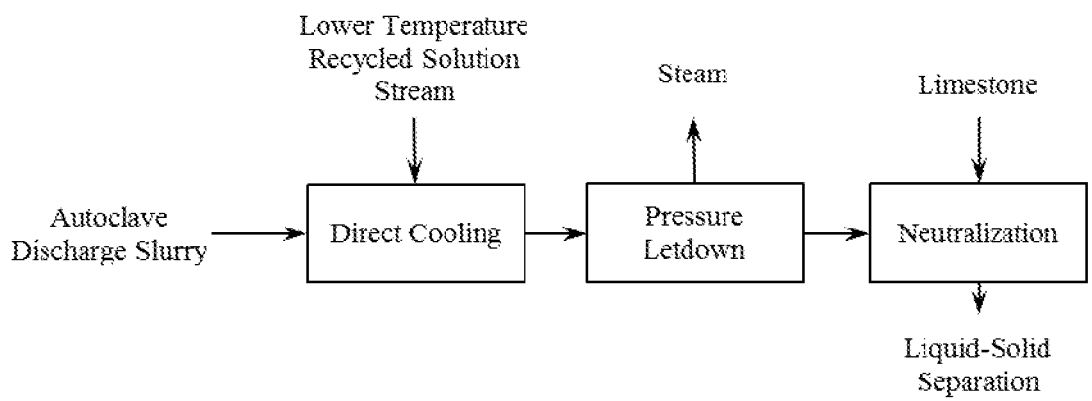

Option 8: Direct Cooling with Recycle Solution, Pressure Letdown and Neutralization In situations where acid values are less valuable, the autoclave discharge slurry can be partially cooled and then neutralized to reduce the amount of cooling water or solution required to control the arsenic concentration in solution and residue stability. Cooling of the slurry can be accomplished using direct addition of a cool process solution to the slurry or using a heat exchanger (e.g., cooling tower), followed by pressure letdown and then by neutralization of the autoclave discharge slurry, using limestone or another suitable neutralizing agent, in a neutralization tank. This configuration also reduces the amount of steam lost from flashing, resulting in a solution with a lower free acid level. This option is shown in FIG. 14.

Option 9: Indirect Heat Exchanger, Pressure Letdown and Neutralization

Figure 15:
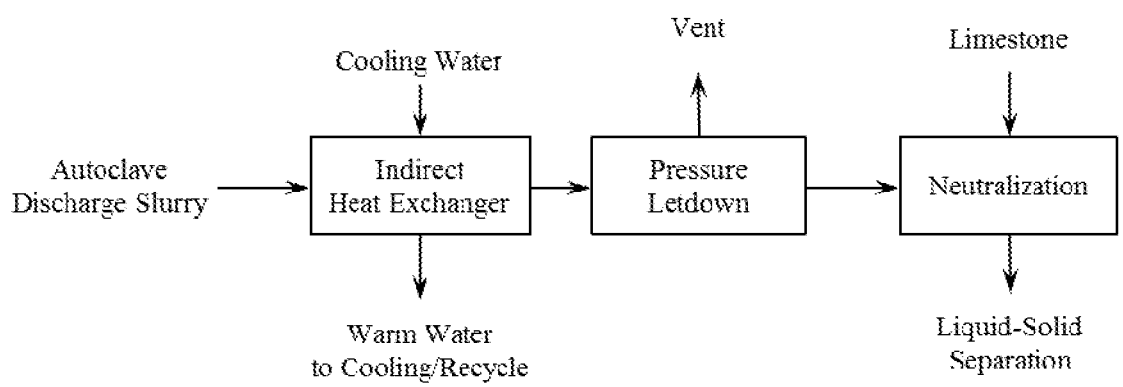

Similarly, flashing can be used in combination with indirect cooling, such as in a heat exchanger using cooling water, to cool the autoclave discharge slurry, followed by neutralization of the autoclave discharge slurry, using limestone or another suitable neutralizing agent, in a neutralization tank, before liquid solid separation of the autoclave discharge slurry. This option is shown in FIG. 15.

Option 10: Flashing and Bulk Liquid Solid Separation

Figure 16:
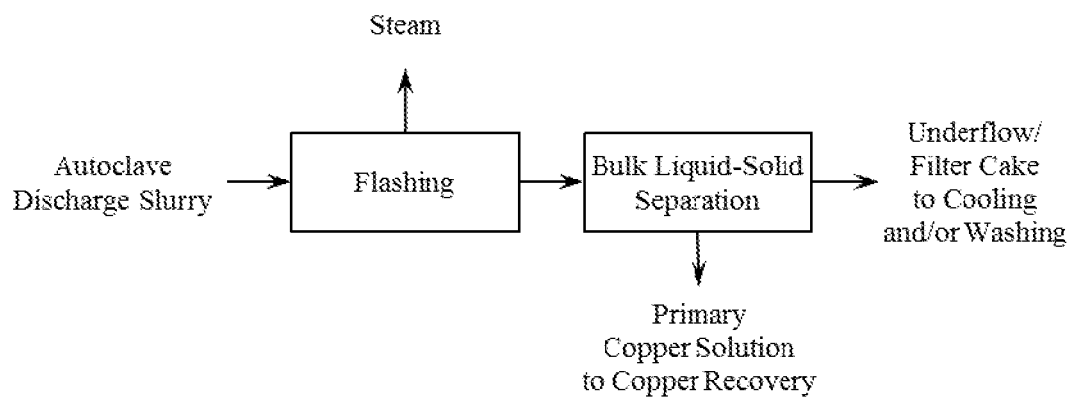

Flashing can be used to let down the autoclave discharge leach slurry to atmospheric pressure followed, in a timely manner, with a bulk liquid solid separation step to effectively separate the majority of the leach solution from the residue as shown in FIG. 16. This option limits the amount of acidic solution that is in contact with the solids. The resultant low arsenic-containing leach solution can then be subsequently processed to recover the copper values. The remaining slurry, which contains a small fraction of the pressure oxidative product solution, can then be further processed in subsequent cooling and/or liquid-solid separation steps with the recovered solution re-directed back to the pressure oxidative leach step to address the higher levels of arsenic contained in this solution, or to another process step (for example, a stand alone solvent extraction step) to recover the remaining contained copper.

It should be understood that direct cooling in any of the above options, if performed with a non-acidic or even less acidic cooling agent, reduces the free acid level through dilution, lessening or avoiding use of a neutralizing agent. It will also be understood that the term "neutralizing", as used herein and in the claims, broadly refers to reducing the free acid level. Regardless of the configuration used for the pressure letdown and any cooling and neutralizing steps, further cooling and reduction of acid concentrations of the autoclave discharge slurry occurs during a liquid-solid separation step, which is performed to recover the copper contained in solution and to separate it from the solid leach residue. The operating temperature of the liquid-solid separation step is preferably between 20 and 80° C., more preferably between 20 and 50° C.

Liquid solid separation may be accomplished by a number of different methods, including thickening, filtration, centrifuging or hydrocycloning, or a combination of these methods. Washing of the solid residues is preferably employed in this step to help recover soluble copper values, such as in a countercurrent decantation wash (CCD) thickening circuit or a series of belt and/or pressure filters.

Depending on the retention time and operating temperature in the liquid solid separation, some additional arsenic from the solids may re-dissolve in this step. Lower retention times of the slurry in the initial liquid solid separation stage after letdown and cooling minimizes re-dissolution.

D. Copper Recovery

Copper may be recovered from the concentrated copper solution obtained from the liquid solid separation and washing step, for example using solvent extraction, which is typically accomplished using one of several commercially available oxime reagents (e.g. Acorga™ or LIX™). Two different exemplary solvent extraction configurations are set out below, depending on the overall copper recovery flowsheet for a given operating site.

The copper solution derived from pressure leaching can be treated directly in a standalone solvent extraction circuit. Neutralization of a portion of the free acid in the copper pressure leach solution may be performed, depending on the acid concentration of the copper solution and the solvent extraction reagent being used. Alternatively, the copper solution derived from pressure leaching may be combined with heap leach solutions from a heap leaching operation in close proximity. The heap leaching solution provides dilution to the copper and acid concentrations of the solution, allowing it to be treated directly in solvent extraction, without neutralization of any of the free acid in the solution.

The solvent extraction reagent is stripped with spent electrolyte to produce loaded electrolyte for copper recovery as copper cathode in electrowinning.

Raffinate from the solvent extraction circuit contains the following:
 i. all or a portion of the free acid values from the pressure leach solution;
 ii. the acid associated with the copper loaded onto the solvent extraction reagent;
 iii. the remaining copper that was not loaded in solvent extraction; and
 iv. essentially all of the arsenic present in the solution from the liquid solid separation step.

E. Raffinate Treatment

The raffinate may be further treated in one or both of the following techniques. Firstly, the arsenic-containing solution may be recycled to the pressure leach autoclave to fix the remaining arsenic as a stable iron arsenic compound, with or without neutralizing (or partially neutralizing) the free acid in the solution recycle, depending on the amount of free acid in the recycle stream. Alternatively, or in addition, the acid in the raffinate may be used for heap leaching of copper oxides or copper sulphide ores to produce a copper-containing leach solution for subsequent recovery in solvent extraction. A portion of the leach solution generated from heap leaching with this raffinate solution may need to be treated to bleed arsenic from solution to prevent it from building up to unacceptable levels in the heap leach solutions.

Advantages/Distinctions

This process allows for the treatment of a wide range of arsenical materials, for example, arsenical sulphide ores and concentrates, arsenical dusts from pyrometallurgical operations and solutions containing arsenic in soluble form.

a) Control of Fe:As Molar Ratio

The feed to the autoclave is preferably controlled to maintain Fe:As molar ratios above 4:1 in the combined process feed to help control the stability of the arsenic solids produced.

The Dundee patent applications teach that minimum Fe:As molar ratios are required to limit the formation of copper arsenates, which result in copper losses to the solids. These patent applications teach a minimum Fe:(As+Sb) molar ratio of 1:1, with minimum molar ratios of 2:1 and 4:1 being preferred. The CESL patent teaches a minimum Fe:As molar ratio of 1:1 with a molar ratio of 3:1 being preferred, to avoid the formation of copper arsenates.

Contrary to the teachings in the above-mentioned CESL and Dundee patent references, Example 1 herein demonstrate that copper arsenate formation occurs at all Fe:As molar ratios (between 2.5:1 and 30:1), but to varying degrees depending on the Fe:As molar ratio in the feed materials. At molar ratios of 4:1 or less, which are embraced by the prior art, copper extractions drop below 95% and the environmental stability of the autoclave discharge solids during pressure letdown and cooling drops off significantly. As shown herein, operating with these low Fe:As molar ratios may not produce an environmentally stable residue, as measured by TCLP analysis, and can result in high levels of arsenic in solution reporting to the solvent extraction.

Thus, in embodiments of this process, the Fe:As molar ratio is controlled to higher Fe:As molar ratios to produce solids, where acceptable levels of copper arsenate are precipitated, and the solids are of suitable environmental stability, as measuring using TCLP analysis. In accordance with some embodiments, Fe:As molar ratios in the combined process feed of greater than 4:1 are used, or Fe:As molar ratios preferably at or greater than 4.5:1, 5:1 and 6:1 are used.

b) High Temperature Pressure Oxidation

At the high temperature and highly oxidative conditions preferably used in the pressure oxidative leaching step of some embodiments, arsenic is typically precipitated as basic ferric arsenate sulphate (BFAS), which is more stable than scorodite that is typically precipitated at lower temperatures (see M. A. Gomez et al., "Hydrothermal reaction chemistry and characterization of ferric arsenate phases precipitated from $Fe_2(SO_4)_3$—$As_2O_5$—$H_2SO_4$ solutions", Hydrometallurgy, 107, 3-4, May 2011, pp 74-90).

The solids produced in pressure oxidation are also preferably "fully" oxidized, meaning that essentially all of the sulphide sulphur in the process feed is converted to sulphate, eliminating elemental sulphur in the leach solids. The solids instead consist of iron oxides or jarosites, BFAS or other iron compounds, other precipitates (e.g., gypsum, alunite, etc.), and unleached gangue minerals (e.g. quartz). There is little risk of chemical and/or biological reduction of the solids that would lead to re-dissolution of the contained arsenic precipitates.

In contrast, the solids produced from a medium temperature (125 to 160° C.) process, such as the CESL process, would contain a mixture of oxidized minerals, gangue minerals and elemental sulphur. The long term environmental stability of these residues is uncertain as there is potential for chemical reduction, due to the interaction of elemental sulphur with the oxidized solids, and for biological assisted reduction, due to the potential interaction of sulphur-reducing bacteria, which may lead to destabilization of arsenic minerals and/or resolubilization of arsenic from the solids.

The preferred high temperature and highly oxidizing conditions of some embodiments of this invention result in sulphur in the sulphide minerals in the autoclave feed being oxidized to sulphate, and thus more free acid (sulphuric acid) is produced which can be used for heap leaching of copper ores than would be available in a medium temperature (125 to 160° C.) process, such as the CESL process. By being able to control and/or minimize the amount of arsenic in the copper product solution, some embodiments of this invention make provision for the integration of the pressure leach plant with a heap leach operation.

The preferred high temperature and highly oxidizing conditions of some embodiments of this process also eliminate the requirement for halide ions in solution as a catalyst to help promote copper leaching, such as in the medium temperature CESL process.

c) Neutralization Agents in the Autoclave

The addition of copper containing neutralizing agents to the pressure oxidation step in some embodiments allows for the reduction of the free acid level in the pressure oxidation step, which can improve the stability of the solids produced in the pressure oxidation step and can reduce the amount of re-dissolution of arsenic during the pressure and temperature letdown step. Advantages of using copper containing neutralizing agents include:

i. Free acid in the autoclave is used to leach additional copper values;
  ii. The copper leached from the neutralizing agent is recovered by solvent extraction, along with the other copper values;
  iii. The copper containing neutralizing agents do not contain appreciable amounts of carbonate, thus reducing dilution of the oxygen in the autoclave by $CO_2$, which allows for reduced venting of the autoclave and higher oxygen utilization, compared with carbonate containing neutralization agents such as limestone;
  iv. The copper containing neutralizing agents do not promote scale formation in the autoclave, which reduces the requirements to shut down the autoclave to remove scale, compared with the addition of calcium containing neutralizing agents.

d) Conditions of Letdown, Cooling, Neutralizing and Liquid-Solid Separation

The process lowers the potential for re-dissolution of arsenic from the precipitates formed in the autoclave prior to liquid solid separation and washing to recover the copper solution. While this area is not addressed in the prior art discussed above, significant arsenic re-dissolution, and the production of solids with lower environmental stability, are likely to occur if the letdown, conditioning or hot curing steps, as described in those patent references, are applied to the treatment of an arsenical copper material.

The series of unit operations used in the letdown, neutralizing, cooling and liquid solid separation steps of some embodiments work together to lower and control the amount of time the autoclave discharge solids are in contact with solutions at elevated temperature (for example, greater than 70° C.) and/or with high acidity (for example, >35 g/L), and recover a copper solution with low levels of arsenic in solution.

The process addresses gaps or deficiencies in the teachings of the prior art patent references mentioned above. The above-mentioned U.S. patents to Freeport McMoran/Phelps Dodge do not teach the need for or use of specific conditions to control or minimize the dissolution of arsenic or other metals during the pressure/temperature letdown stage nor do they teach any specific configuration or combination of letdown, cooling, and/or liquid solid separation steps to accomplish this. Thus, there is no discussion in these patents of the retention time employed in the flash vessels or slurry coolers or the required rate of cooling, nor are there desirable ranges of temperature, acidity or time at temperature provided in these patent documents. There is also no teaching on the effect of letdown and/or cooling steps on the environmental stability of the residues produced, nor methods indicated to address this. As such, the conditions and unit operations for the pressure and temperature letdown/cooling of the autoclave slurry taught in the above patent references, as applied to treating arsenical copper materials, in the experience of the present inventors, may lead to elevated levels of arsenic in solution.

The practice of dissolving less stable solids by holding the autoclave discharge slurry at elevated temperatures and acidity after flashing is also known as "hot curing" and is taught in a number of patent references. From these patent references, hot curing involves maintaining the autoclave discharge slurry at elevated temperatures (e.g., between 70 and 120° C.) for prolonged periods of time (1 to 24 h) (see for example, the above-mentioned patent applications to Dundee, and U.S. Pat. Nos. 7,604,783 and 8,029,751 to Placer Dome, now Barrick, and U.S. Pat. Nos. 8,252,254 and 8,623,115 to Barrick). Hot curing is generally practised on materials containing significant levels of precious metals to dissolve basic iron sulphate, which may be formed in the autoclave at temperature, using free acid in the discharge slurry. Without hot curing, basic iron sulphate in the solids can lead to high lime consumption in cyanidation.

With the exception of the Dundee patent applications, the patents teaching "hot curing" focus solely on the recovery of precious metals, which report exclusively to the solid residue from pressure leaching, rather than the recovery of copper. The solution produced, with or without hot curing, is typically neutralized with limestone and lime to precipitate most metal ions, with the exception of magnesium, to allow for recycle of water to the process. Thus, there is little need to maintain low levels of arsenic in solution and the patents therefore provide no teaching relating to controlling arsenic concentrations in solution.

However, as shown herein, the extended time at elevated temperatures used in "hot curing" intended for the re-dissolution of basic iron sulphate can also re-dissolve at least a portion of the arsenic-containing precipitates formed at temperature, with more re-dissolution higher temperatures and longer retention times (see also Collins, M. et al., "Design of the AGA Brasil Refractory Gold Pressure Oxidation Plant", Pressure Hydrometallurgy 2012, Collins, M. J., et al., Eds., CIM, Westmount, Canada, 2012, pp. 3-14). Thus, 'hot curing" can increase the amount of arsenic in solution and can also decrease the environmental stability of the solids, compared to the arsenic levels originally present in the solution and the stability of the solids discharged from the autoclave.

e) Integration with Heap Leach

Patents teaching the integration of high temperature copper pressure leaching with a heap leach operation include U.S. Pat. Nos. 5,698,170 and 5,895,633 to Placer Dome, now Barrick, and U.S. Pat. Nos. 6,680,034; 7,473,413 and 7,666,371 to Freeport McMoran. However, these patents focus on the pressure leaching "clean" copper concentrates (i.e., concentrates that do not contain arsenic). As such, none of these patents teach how to minimize or control the impact of arsenic dissolved in pressure leaching when integrated with a heap leach operation.

By being able to control and/or minimize the amount of arsenic in the copper product solution, some embodiments make provision for the integration of the pressure leach plant with a heap leach operation. The heap leach makes use of the acid produced from the total oxidation of the sulphide minerals in the autoclave feed to leach additional copper values, which would otherwise have to be made up with purchased sulphuric acid. Thus, the ability to integrate a pressure leach of sulphide feeds with a heap leach operation could significantly reduce the operating costs for an existing heap leach operation.

The process provides benefits if the copper pressure leach is operated as a standalone plant or in integration with a heap leach operation by producing an acidic low arsenic raffinate to heap leaching to utilize the acid values for recovering additional copper values.

The control and/or minimization of arsenic re-dissolution and the utilization of the acid in the heap leach also reduces the need to neutralize and/or recycle the leach solution or arsenic containing solids to the autoclave to fix arsenic as a stable iron arsenate precipitate.

In summary, embodiments of the process may provide the following:
  i. High recovery of copper from arsenical copper materials;
  ii. Minimal deportment of arsenic to copper solution; and
  iii. Maintain environmental stability of arsenical materials produced at elevated temperature.

The process involves a combination of steps to treat arsenical copper materials to recover copper as a leach solution, containing low levels of arsenic, and rejecting the majority of the arsenic to a solid residue, which has a high level of environmental stability with respect to arsenic.

The process and the basis for preferred conditions of the process are further described in the following non-limiting examples.

EXAMPLE 1

Batch testing was performed with a process feed made up of different weight ratios of the following feed materials, including the following:

Concentrate 1 containing 32% Cu, 5.6% As, 15% Fe and 30% S

Concentrate 2 containing 26% Cu, 1.1% As, 24% Fe and 35% S

Roaster Dust, from treatment of copper concentrates, containing 22% Cu, 8.3% As, 10% Fe and 5% S.

The above materials, with the exception of the roaster dust, were also used as the process feed for pilot plant testing in a multiple compartment horizontal autoclave with continuous feeding of the autoclave and withdrawal of the autoclave discharge slurry. In addition, in some of the batch and continuous testing, arsenic bearing solutions (6 to 14 g/L As, 0.3 to 0.6 g/L Cu, 0.1 to 1.0 g/L Fe, 17 to 22 g/L $H_2SO_4$) were added as a portion of the quench solution.

In these tests, the Fe:As molar ratio in the combined process feed (i.e., calculated based on the total of the process feed and the quench solution) to the autoclave was varied from 2.5:1 to 29.5:1. The leaching conditions were 220° C.

and 500 kPa oxygen pressure with a retention time of 60 minutes in the batch tests and 45 to 60 minutes in the continuous tests.

FIG. 17 shows the relationship between the Fe:As molar ratio in the feed on the copper extraction for the batch and continuous tests. The relationship between Fe:As molar ratio and copper extraction was not dependent on the source of the iron and arsenic into the autoclave (i.e., in solid or solution or in sulphide minerals or more oxidized compounds). For example, the circled area on FIG. 17 highlights the results from three periods of operation in the continuous test work: two periods that were operated with a process feed containing a 1:1 weight ratio of Concentrate 1 to Concentrate 2 with water added as quench solution (Fe:As molar ratio of 7.8) and a third period operated at a 3:1 weight ratio of Concentrate 1 to Concentrate 2, along with an arsenic containing solution (13 g/L As, 23 g/L $H_2SO_4$) making up 16% of the quench solution (Fe:As molar ratio of 7.6). All three periods had similar Fe:As molar ratios in the combined process feed to the autoclave and resulted in similar net copper extraction after leaching.

Sulphide oxidation in all of these tests was over 99.5%, meaning that essentially all of the copper sulphide minerals in the process feed had been oxidized and leached. Copper extractions below 99.5% indicate that a portion of the copper has been precipitated as an insoluble copper arsenate. FIG. 17 shows that some precipitation of copper arsenates occurs at all of the Fe:As molar ratios tested, but the extent of copper arsenate precipitation is lower at higher Fe:As molar ratios. In continuous tests, the copper extraction dropped below 95% at a Fe:As molar ratio of about 4:1.

Figure 18:
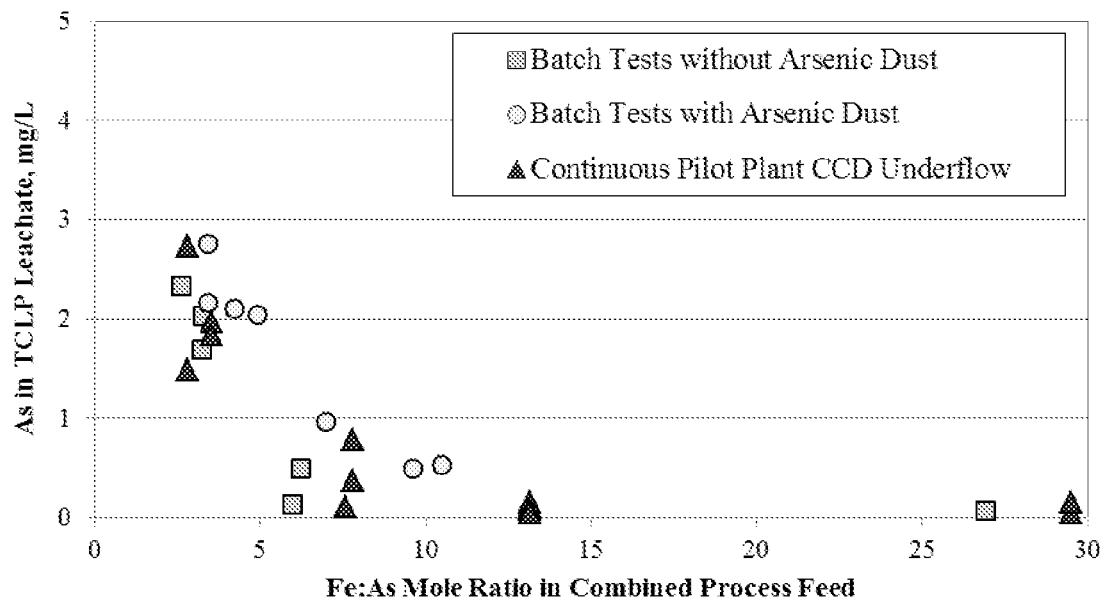
FIG. 18 is a graph showing arsenic residue stability (measured by the concentration of As in TCLP leachate from TCLP testing of residues) as a function of Fe:As molar ratio in the combined process feed, as determined in Example 1.

FIG. 18 shows a similar relationship between the Fe:As molar ratio in the total feed to the autoclave and the residue stability, as measured by the concentration of arsenic in the leachate from TCLP testing of the residues. Residues at higher Fe:As molar ratios have a greater stability (i.e., lower As in TCLP leachate). Stability decreases significantly at Fe:As molar ratios below 4:1 in the combined process feed to the autoclave.

Figure 19:
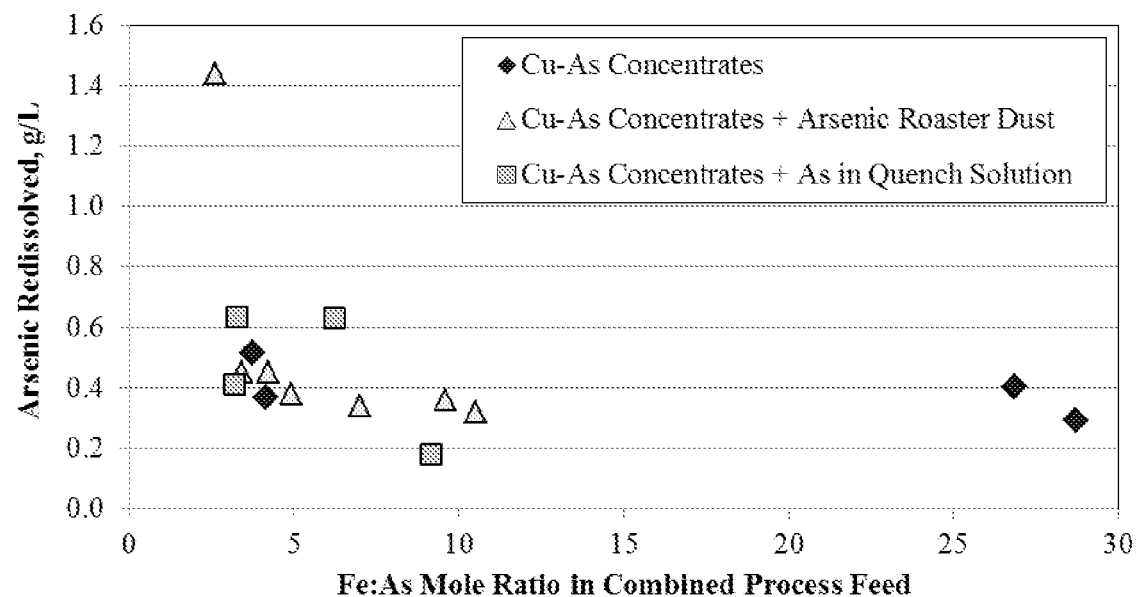
FIG. 19 is a graph showing arsenic re-dissolution as a function of Fe:As molar ratio, as determined in Example 1.

FIG. 19 illustrates the difference between the arsenic in solution after leaching and the arsenic in solution after 30 minutes of reaction time at 95° C. for the batch tests from this example. For this fixed time at temperature in the batch tests, the amount of arsenic re-dissolved increased with decreasing Fe:As molar ratio in the combined process feed, with a significant increase in arsenic in solution at Fe:As molar ratios at or below 4:1.

All of these results show advantages to operating at Fe:As molar ratios of greater than 4:1 in the combined process feed with quench solution. Further improvements are obtained operating at Fe:As molar ratios at or greater than 4.5:1, 5:1 and 6:1. Fe:As molar ratios of up to 29.5:1 were tested, although molar ratios higher than 25:1, or even higher than 15:1, while still effective, are unlikely to have realistic application in the industry. It was noted that operating at higher Fe:As molar ratios above 15:1 in the combined process feed did not significantly improve the copper extraction or the amount of arsenic in solution or the residue stability over that achieved at molar ratios less than 15:1. Such high molar ratios instead reduce the amount of arsenic in the combined process feed that can be processed and fixed in the autoclave.

EXAMPLE 2

A series of batch pressure oxidation tests were conducted with a process feed containing 32% Cu, 5.6% As, 15% Fe and 30% S (Fe:As molar ratio of 3.9:1) at 220° C. and 500 kPa oxygen pressure. Process water, containing 0.05 g/L Ca, 0.9 g/L Na, 0.09 g/L K and 1.5 g/L Cl, was added to simulate the addition of quench solution in a commercial autoclave. The Fe:As molar ratio in the combined process feed was 3.9:1.

After 60 minutes, the autoclave discharge slurry samples were rapidly cooled and filtered, with the solids washed. The solids were then recombined with the filtrate, either as discharged from the autoclave or after neutralization to lower the acid concentration before being reacted in a stirred vessel at 50, 70 or 95° C. for 6 hours.

Figure 20:
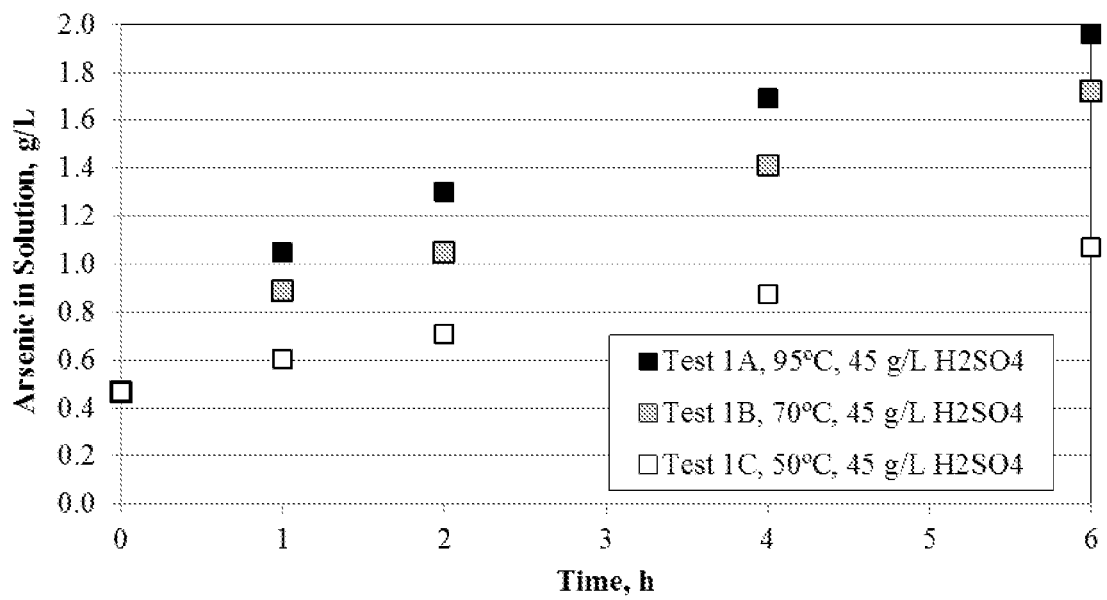
FIGS. 20 to 22 are graphs showing arsenic in solution as a function of time, for different temperature conditions as described in Example 2.
Figure 21:
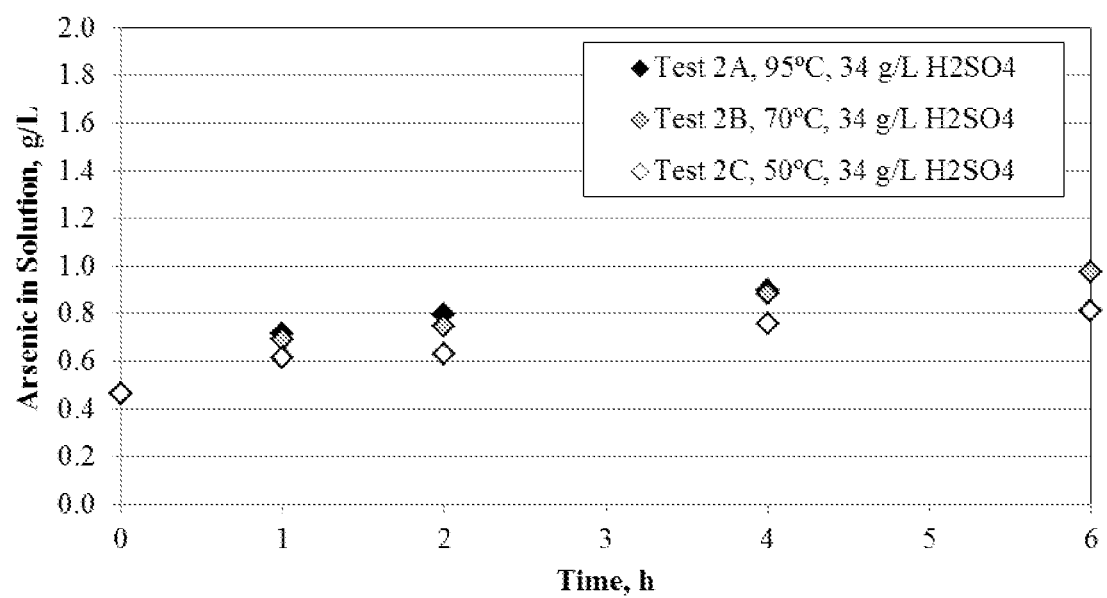
Figure 22:
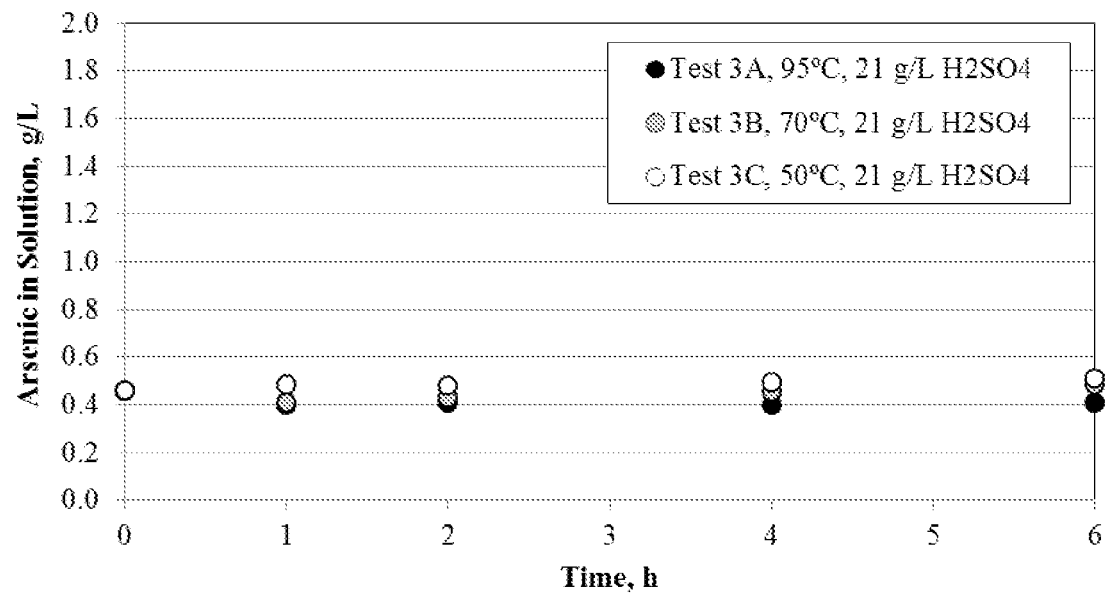

FIGS. 20-22 show the concentrations of arsenic in solution with reaction time at the temperatures tested. These figures demonstrate that high temperatures, high acidity and longer reaction times promote the re-dissolution of arsenic precipitates in the autoclave discharge solids.

Operating at lower temperature (for example, 50° C.) and/or reducing the acid concentration to below 35 g/L, preferably below 20 g/L, while minimizing the time at elevated temperature or acid levels, significantly reduces or eliminates the redissolution of arsenic from the discharge solids.

Figure 23:
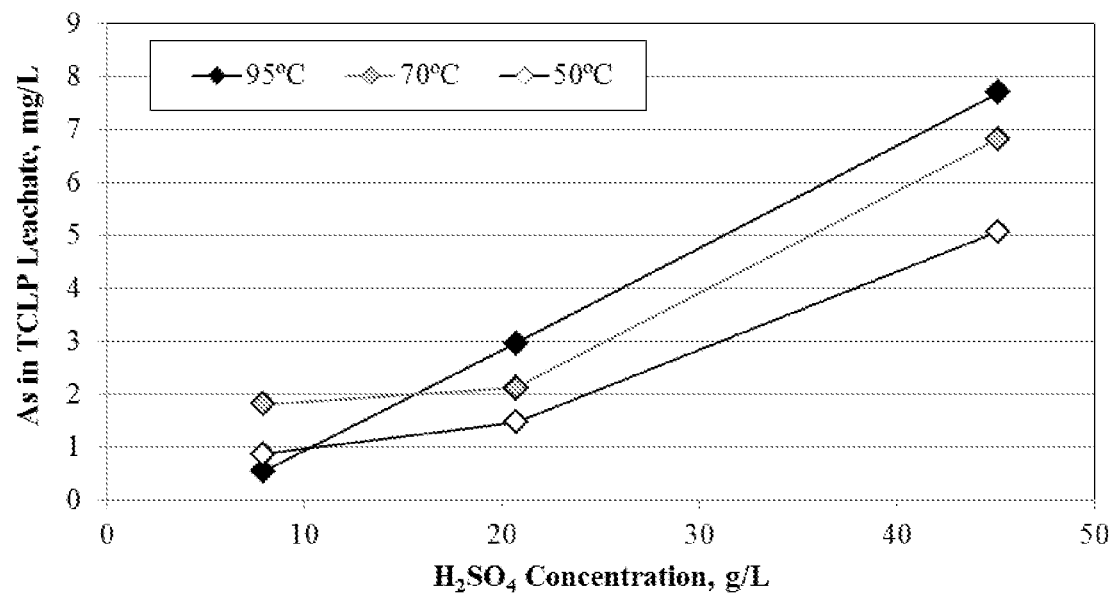
FIG. 23 is a graph showing arsenic in TCLP leachate as a function of free acid concentration, as determined in Example 2.

FIG. 23 shows that prolonged exposure to higher temperatures and acid concentrations also has a negative effective on the stability of the solids, as measured by TCLP analysis on the solids after 6 h of reaction under each condition. Cooling and/or neutralization of the autoclave discharge slurry are required to maintain the stability of the residue prior to liquid solid separation.

EXAMPLE 3

Continuous pilot plant testing was performed with a process feed containing 32% Cu, 5.6% As, 15% Fe and 30% S, with quench solution containing 16% as an arsenic bearing solution (14 g/L As, 0.3 g/L Cu, 22 g/L $H_2SO_4$) and the remaining quench solution as process water, containing 0.05 g/L Ca, 0.9 g/L Na, 0.09 g/L K and 1.5 g/L Cl. The Fe:As molar ratio in the combined process feed was 2.8:1. The leaching conditions were 220° C. and 500 kPa oxygen pressure with a retention time of 60 minutes.

Figure 24:
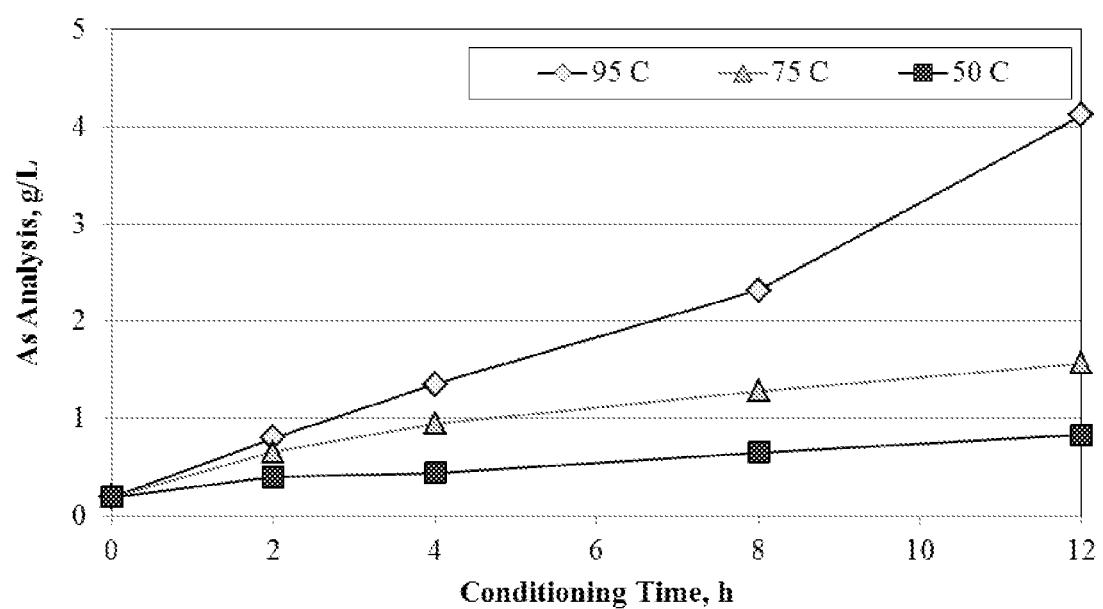
FIG. 24 is a graph of arsenic content as a function of residence time at three temperatures in a continuous pilot plant test, as described in Example 3.

A sample of the autoclave discharge slurry was cooled rapidly to 50° C. and then filtered, with the solids washed. The solids were then recombined with the filtrate, either as-discharged from the autoclave or after neutralization to lower the acid concentration before being reacted in a stirred vessel at 50, 75 or 95° C. for 12 hours. FIG. 24 shows the increase of arsenic in solution with time for the three temperatures tested. The solids residues also showed greater environmental stability, as measured by TCLP analysis, at temperatures below 95° C., as shown in Table 1.

TABLE 1

| Reaction Temperature, ° C. | 95 | 75 | 50 |
|---|---|---|---|
| Reaction Time, h | 12 | 12 | 12 |
| As in TCLP Leachate, mg/L | 3.96 | 1.65 | 1.92 |

EXAMPLE 4

Two batch pressure oxidation tests were conducted at 220° C. and 500 kPa oxygen pressure for 60 minutes. After leaching, the slurry was held at 95° C. for 30 minutes.

The process feed to Test 1 was an arsenical copper sulphide concentrate containing 32% Cu, 5.6% As, 15% Fe and 30% S. The process feed to Test 2 was a mixture of 78% of the arsenical copper sulphide concentrate (32% Cu, 5.6% As, 15% Fe and 30% S) and 22% of a sulphur-deficient copper matte (64% Cu, 0.3% As, 6.2% Fe, and 18.9% S), by mass. In both Test 1 and 2, process water, containing 0.05 g/L Ca, 0.9 g/L Na, 0.09 g/L K and 1.5 g/L Cl, was added to simulate the addition of quench solution in a commercial autoclave. The Fe:As molar ratio in the combined process feed was 4.0:1 for Test 1 and 4.4:1 for Test 2. Table 2 summarizes results of the two tests.

TABLE 2

| Test No. | 1 | 2 |
|---|---|---|
| Copper Extraction after Leaching, % | 96.5 | 97.0 |
| Free Acid after Leaching, g/L | 43.7 | 27.0 |
| Arsenic in Solution, g/L | | |
| After 60 min of Leaching | 0.36 | 0.16 |
| After 30 min at 95° C. | 0.92 | 0.31 |
| Arsenic Redissolution, g/L | 0.56 | 0.15 |
| Arsenic in TCLP Leachate, mg/L | 1.98 | 0.79 |

The copper extraction increased due to the increase in Fe:As molar ratio with the addition of the copper matte. The addition of copper matte neutralized the free acid in the autoclave by the following reaction to lower the free acid in solution below 30 g/L:

$$Cu_2S+H_2SO_4+2.5O_2=2CuSO_4+H_2O.$$

The lower free acid in the autoclave significantly reduced the amount of arsenic in solution after leaching and the amount of arsenic redissolved when the slurry was held at 95° C. for 30 min. The stability of the solids, as measured by the arsenic concentration in TCLP leachate, also improved significantly by adding copper matte to the solid feed to the autoclave.

Other similar copper containing neutralizing agents, including other materials containing copper sulphide minerals with an overall Cu:S molar ratio greater than 1:1 and copper oxides or hydroxides are expected to have a similar effect based on the neutralizing reactions set out above.

The experimental conditions set out above are exemplary only and the process may be practised under other conditions without departing from the invention.

As used herein and in the claims, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

All publications mentioned in this specification are indicative of the level of skill of those skilled in the art to which this invention pertains. All publications are herein incorporated by reference to the same extent as if each individual publication was specifically and individually indicated to be incorporated by reference.

The terms and expressions used in this specification are used as terms of description and not of limitation. There is no intention, in using such terms and expression of excluding equivalents of the features shown and described, it being recognized that the scope of the invention is defined and limited only by the claims which follow.

We claim:

1. A process for recovering copper from a process feed which includes one or more feed components containing a base metal sulphidic feed, iron, copper and arsenic, the process comprising:
   a) preparing the process feed and an aqueous quench solution;
   b) introducing the process feed and the aqueous quench solution to a pressure oxidative leaching step in a pressure vessel and providing oxygen to maintain a partial pressure of oxygen above 200 kPa in the pressure vessel to form free sulphuric acid, to solubilize copper and other base metal in the feed as aqueous sulphate compounds and to precipitate arsenic as solid iron arsenic compounds;
   c) withdrawing from the pressure vessel a treated slurry comprising a liquid phase containing sulphuric acid and copper sulphate, and solids containing the iron arsenic compounds, and separating the liquid phase from the solids while limiting the residence time that the treated slurry is exposed to one or both of a temperature above 70° C. and a free acid level above 35 g/L in order to lessen arsenic re-dissolution and to maintain stability of the solid iron arsenic compounds, by:
   I. one or both of cooling the treated slurry to a temperature less than 70° C. prior to separating the liquid phase from the solids, and reducing the free acid level to less than 35 q/L prior to separating the liquid phase from the solids;
   or
   ll. flashing the treated slurry to atmospheric pressure followed by immediately separating a majority of the liquid phase from the solids; and
   d) recovering copper metal from the separated liquid phase.

2. The process of claim 1 wherein step a) includes preparing the process feed and the aqueous quench solution so that the Fe:As molar ratio is greater than 4:1 for the combined process feed and the aqueous quench solution.

3. The process of claim 2, wherein the Fe:As molar ratio in step a) is at or greater than 4.5:1, 5:1 or 6:1.

4. The process of claim 2, wherein step I or II of step c) is performed, and wherein step I, if performed, includes a sequence comprising one of:
   i. cooling the treated slurry before letting down pressure to atmospheric pressure, followed by separating the liquid phase from the solids;
   ii. flashing the treated slurry to atmospheric pressure, followed by cooling the treated slurry, followed by separating the liquid phase from the solids;
   iii. flashing the treated slurry to atmospheric pressure, followed by neutralizing at least a portion of the sulphuric acid in the treated slurry, followed by separating the liquid phase from the solids;
   iv. flashing the treated slurry to atmospheric pressure, followed by neutralizing at least a portion of the sulphuric acid in the treated slurry, cooling the treated slurry, and separating the liquid phase from the solids;
   v. cooling the treated slurry before letting down pressure to atmospheric pressure, followed by neutralizing at least a portion of the sulphuric acid in the treated slurry and separating the liquid phase from the solids; and
   vi. flashing the treated slurry to atmospheric pressure, followed by cooling the treated slurry, neutralizing at least a portion of the sulphuric acid in the treated slurry, and separating the liquid phase from the solids.

5. The process of claim 4, wherein step i) or ii) is performed, and cooling reduces the temperature of the treated slurry to less than 50° C. in less than 1 hour, or in less than 30 minutes.

6. The process of claim 4, wherein step iv), v), or vi) is performed, and cooling reduces the temperature of the treated slurry to less than 70° C. in less than 1 hour, or in less than 30 minutes.

7. The process of claim 4, wherein cooling is direct or indirect.

8. The process of claim 4, wherein one or both of neutralizing and cooling by direct cooling reduces the free acid level in the treated slurry to less than 35 g/L.

9. The process of claim 4, wherein one or both of neutralizing and cooling by direct cooling reduces the free acid level in the treated slurry to less than 20 g/L.

10. The process of claim 8, wherein neutralizing in step c) is conducted with limestone.

11. The process of claim 1, wherein the process feed to step b) includes one or more copper containing neutralizing agents to control the free acid level in the treated slurry in step c) to a free acid level no greater than 35 g/L.

12. The process of claim 11, wherein the copper containing neutralizing agent is one or more of a material containing copper sulphide minerals with an overall copper to sulphur molar ratio greater than 1:1, and a material containing copper oxides or hydroxides.

13. The process of claim 12, wherein the material containing copper sulphide minerals is a copper matte.

14. The process of claim 12, wherein the material containing copper oxides or hydroxides includes one or more of copper oxide ores, copper oxide concentrates, roaster dust, roaster calcine, copper oxide, copper hydroxide or basic copper sulphate.

15. The process of claim 14, wherein the material containing copper oxides or hydroxides is one or both of a roaster dust and a roaster calcine from a pyrometallurgical treatment of a copper ore or concentrate.

16. The process of claim 1, wherein the pressure vessel is an autoclave and the partial pressure of oxygen is maintained in the autoclave in the range of 200 to 1000 kPa, or at about 500 kPa.

17. The process of claim 16, wherein the temperature in the autoclave is maintained in the range of 210 to 230° C., or in the range of 215 to 225° C.

18. The process of claim 17, wherein the retention time in the autoclave is between 30 and 90 minutes, or between 45 and 60 minutes.

19. The process of claim 18, wherein the temperature of the liquid solid separation is in the range of 20 to 80° C., or in the range of 20 to 50° C.

20. The process of claim 1, wherein the solid iron arsenic compounds include basic ferric arsenate sulphate.

21. The process of claim 1, wherein all or a portion of the aqueous quench solution is an arsenic-containing solution.

22. The process of claim 1, wherein step d) comprises recovering copper metal from the separated liquid phase by solvent extraction and electrowinning, and producing a raffinate solution from the solvent extraction containing acid and arsenic.

23. The process of claim 22, wherein all or a portion of the aqueous quench solution in step b) is the raffinate solution.

24. The process of claim 23, wherein the raffinate solution is treated with a neutralizing agent to neutralize at least a portion of the free sulphuric acid.

25. The process of claim 24, wherein the neutralizing agent is limestone.

26. The process of claim 22, wherein the raffinate solution from step d) is used as an acid lixiviant in a subsequent copper heap leaching step.

27. The process of claim 1, wherein the separated liquid phase from step c) is used as an acid lixiviant in a subsequent copper heap leaching step.

28. The process of claim 22, wherein the separated liquid phase from step c) is combined with an aqueous solution having a lower free acid level to lower the free acid level of the combined solution prior to solvent extraction.

29. The process of claim 1, wherein the base metal sulphidic feed includes one or more of a copper-containing sulphide ore, a copper-containing sulphide concentrate and a copper-containing sulphide solid.

30. The process of claim 1, wherein the base metal sulphidic feed contains one or both of arsenic and iron.

31. The process of claim 1, wherein the one or more feed components in the process feed includes an arsenical material generated from pyrometallugical treatment of an arsenic-containing sulphidic material.

32. The process of claim 31, wherein the arsenical material includes one or both of a roaster dust and a roaster calcine from a pyrometallurgical treatment of a copper ore or concentrate.

33. The process of claim 1, wherein the base metal sulphidic feed includes an iron-containing sulphidic ore or concentrate.

34. The process of claim 4, wherein step iii) is performed and neutralizing is performed immediately after flashing.

35. The process of claim 4, wherein step II of step c) is performed.

36. The process of claim 1, wherein any neutralizing agent added to the process feed is selected from one or more copper containing neutralizing agents.

* * * * *